July 23, 1963  D. J. CRAWFORD  3,098,799
WOOD TREATING APPARATUS AND PROCESS
Filed Dec. 20, 1960  4 Sheets-Sheet 1

INVENTOR
DAVID J. CRAWFORD,
DECEASED, BY MADELEIN
B. SADTLER, EXECUTRIX

BY Cushman, Darby & Cushman
ATTORNEYS

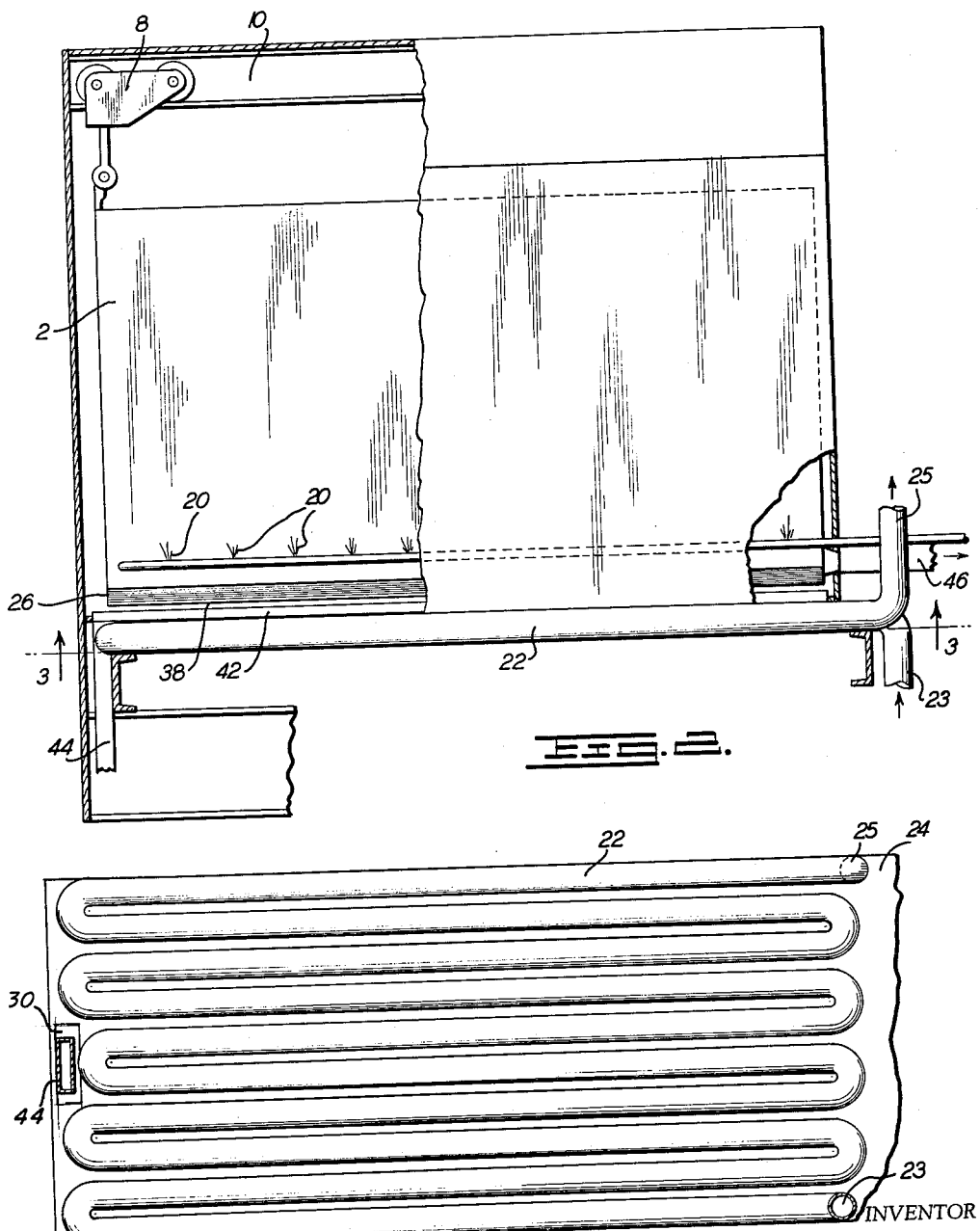

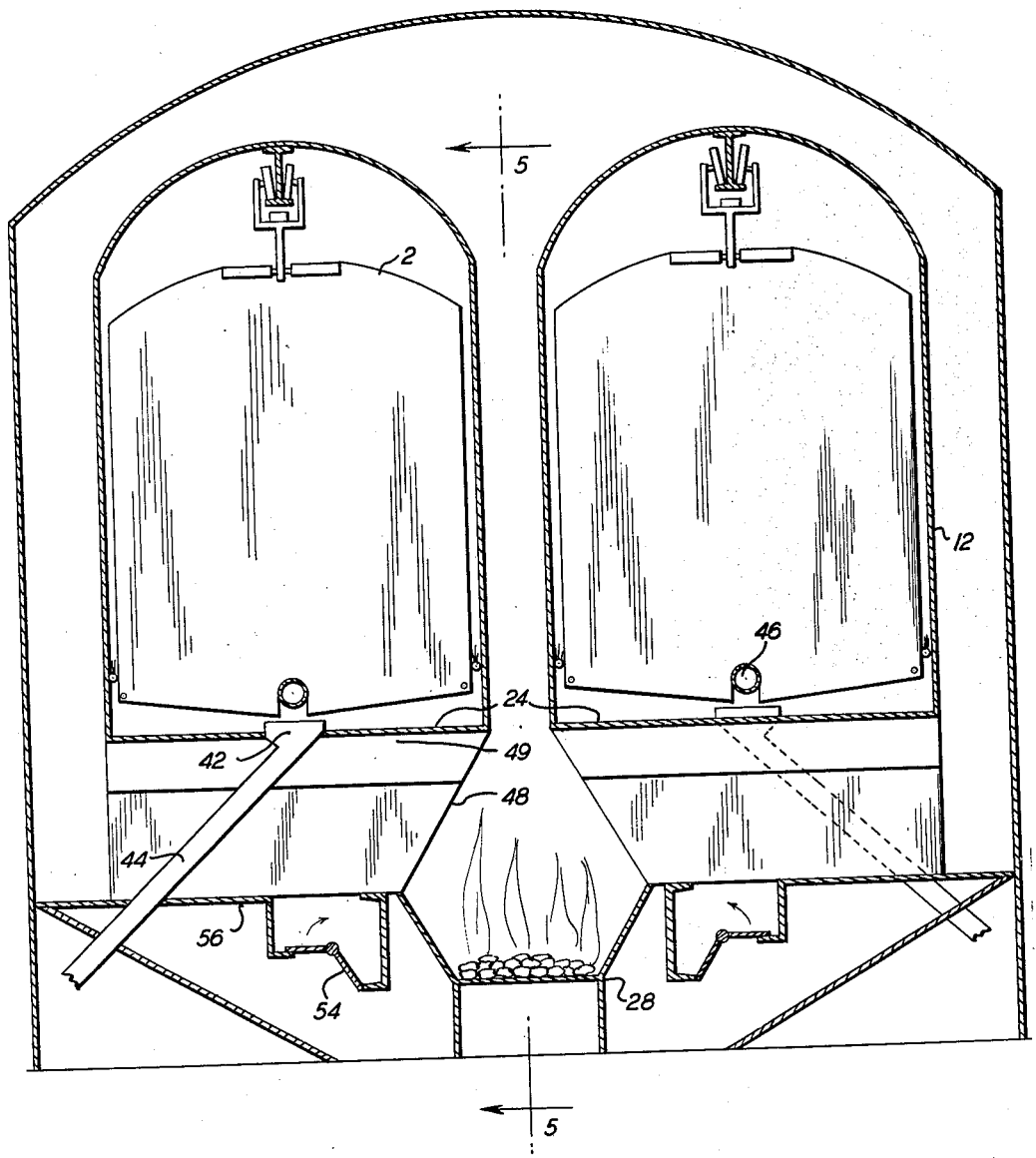

July 23, 1963 D. J. CRAWFORD 3,098,799
WOOD TREATING APPARATUS AND PROCESS
Filed Dec. 20, 1960 4 Sheets-Sheet 4

INVENTOR.
DAVID J. CRAWFORD,
DECEASED, BY MADELEIN
BY B. SADTLER, EXECUTRIX

Cushman, Darby & Cushman
ATTORNEYS

United States Patent Office 3,098,799
Patented July 23, 1963

3,098,799
WOOD TREATING APPARATUS AND PROCESS
David J. Crawford, deceased, late of Cobb Island, Md., by Madeleine B. Sadtler, executrix, Washington, D.C., assignor of one-half to International Bank, Washington, D.C., a corporation of the Republic of Panama
Filed Dec. 20, 1960, Ser. No. 77,243
5 Claims. (Cl. 202—93)

This invention relates to improvements in an apparatus and method for the destructive distillation of wood yielding valuable products of distillation such as turpentine, alcohols, and tars, and additionally valuable by-products, such as carbon dioxide, and charcoal; and more specifically to a mobile composite unit comprising in combination with the destructive distillation apparatus additional boiler means for simultaneously producing steam to assist in the distillation and extraction process, the energy to be utilized in effecting the destruction of the wood and production of steam being obtained from the combustion of the spent wood after extraction of the distillation products therefrom.

Destructive distillation is known as a process wherein wood undergoes thermal decomposition with volatile products being extracted therefrom, subsequently formed and withdrawn as vapors for recovery. In the process of thermally decomposing the wood, there are broadly three stages of extraction. The first extraction of the products are the heavy tars which are generally in a vapor state because of a high decomposition temperature varying between 450° to 600° F. The intermediate products given off are the turpentines with the light molecular weight alcohols being given off last. At the present time, there are two primary types of destructive distillation apparatus, one being the retort type wherein the wood is thermally decomposed in an area substantially free of air and substantially without combustion, the other being a kiln wherein a limited amount of combustion is allowed to take place. In both apparatus, it has been customary to heat the wood, withdraw the vapors upward through a flue or outlet at the top, and condense them in a separate condensation unit. The present invention is an improvement over the prior art in this respect, in that it is contemplated that condensation of the vaporized product be effected in a condensation area directly beneath the decomposing wood rather than to allow the vapors to escape upwardly into a separate condensing unit. A higher percentage recovery will result, particularly of those extraction products too heavy to be vaporized by the temperatures within the retort or the kiln.

Additionally, improved means for selectively distilling the vapor products in situ may be provided, as will be disclosed on further description of the invention.

It has also been suggested in the prior art to utilize the "waste" energy in the spent wood subsequent to the extraction of the distillation products therefrom for providing the necessary heat for the destruction and extraction process, but the present invention is adapted to improve on this utilization. In addition to providing the necessary heat for decomposition, the "waste" heat is also utilized to produce steam, the steam then being injected in the decomposition area to aid in the decomposition and destruction of the wood.

In this latter respect, the invention also contemplates improved apparatus and means for admitting steam to the decomposition and extraction area.

Also, there has been a long felt need, in underdeveloped areas particularly, for a mobile unit adapted to be movable to the particular area where the timber is cut. The present invention is adapted to be so mobile, and to thus effect various economies in the production of turpentine, such as transportation costs, plant costs, and labor costs.

It is also contemplated that the units be combined with a unit for the manufacture of carbon dioxide and charcoal. This unit is especially adapted for underdeveloped areas where timber is abundant and electrical fuel such as oil, gas and coal are scarce. Traditionally in these underdeveloped areas, there has been a large export of meats, vegetables and fruits generally transported at the present time by air transport, without the benefits of quick freezing and low temperature refrigeration. The need for carbon dioxide for refrigeration purposes in such areas is apparent, and thus also there is an apparent need for a mobile device capable of utilizing the abundant timber as a fuel to provide energy, to simultaneously yield valuable products such as turpentine, alcohols and tars, and from which at the same time, valuable by-products such as carbon dioxide and charcoal can be obtained.

The process of the present invention, for the destructive distillation of wood and improved recovery of the distillate products is a batch type kiln process conducted in a partially closed oven adapted to limit somewhat the amount of air supplied in the decomposition and partial combustion of the logs. The logs are first scored to facilitate in their decomposition and in the extraction of distillates, and then are placed upright in specially designed racks movable on conveyors such as to be moved into position within the oven. The resin products are condensed on the lower surface of the rack which is preferably cooled by cooling pipes or other comparable heat reduction means extending across and parallel to said surface. The lower surface of the rack is V-shaped to permit the resin to drain to a trough located at the apex of the V. The extraction gases and thermal decomposition is assisted by steam fed in a down draft manner circulating between the logs thereby given a uniform heating effect. Reagents and solvents may be introduced with the steam to assist in the decomposition process. The steam pipes and jets are positioned in a space along side and between the sides of the racks and the inner wall of the oven, the steam being conveyed upwardly by means of hot air rising along side the racks to be swept downwardly through the logs as will be disclosed in a more specific description of the device.

The cooling pipes or comparable units mentioned above may be a part of a boiler unit acting as a heat transfer unit for the boiler preheat stage. A fire grate and burning fuels thereon are positioned beneath the oven in such a manner that the cooling pipes are located substantially intermediate between the fire grate and the oven and thus are subject to direct heating from the burning fuels. Valves are provided to control the passage of water through the cooling pipes and thus modulate the temperature of the water such that the lower and condensing surface of the rack is maintained at the desired temperature. That temperature should be low enough to condense the extracted vapors, but should also be high enough to prevent the formation of gums or solidification of any of the end products. Thermostatically controlled dampers in the flue spaced on each side of the oven modulate and progressively advance the temperature of the oven and also provide control means for controlling the temperature of the water in the cooling pipes. Additional dampers positioned beneath the grate may be utilized to control the temperature and rate of combustion of the fuel.

The lower portion of the racks are constructed and operated as a gate means releasably holding the logs, such that the raw wood when it has been destructively reduced to a cellulose product, is released onto a conveyor from whence it is conveyed to the fire grate and burned under the above mentioned controlled combustion conditions.

The heat from this combustion stage may be utilized to additionally produce steam in a boiler means, or subsequent to being burned to charcoal, may be additionally dropped into a separate burning area to provide heat directly to a boiler unit. In any event, in the second stage of burning, the invention contemplates a damper unit controlling the air input such that carbon dioxide is produced. The carbon dioxide is fed through a flue to a standard Girdler carbon dioxide unit where the carbon dioxide is separated from other flue gases and pressure stored.

The whole unit is adapted to be supported on a single frame provided with wheels or other comparable means such that it can be readily transported to the area where the raw stock is being cut and scored.

Thus it is a primary object of this invention to provide an improved apparatus adapted for the thermal decomposition, extraction and distillation of wood products and the condensation thereof.

It is also an object of this invention to provide improved temperature controlled conditions for the thermal decomposition of wood. It is also an object of this invention to provide a means composite with the thermal decomposition apparatus for the condensation of the volatile distillation products adapted to condense the distillation products beneath the supported wood products and thus improve on the percentage recovery.

It is another object of this invention to provide an improved means for circulating steam and other reagents in a novel down draft manner through the wood to assist in the thermal decomposition.

It is still another object of this invention to provide a boiler means in which "waste" heat from the thermal decomposition process is utilized to produce steam to assist in the decomposition, and wherein the boiler preheat heat exchanger in the cooling means for condensing the distillate or volatile wood extraction products.

Another object of this invention is to provide a novel and improved means for closely controlling combustion and thus temperature in the distillation kilns.

Another object of this invention is to provide a means for controlling the combustion of wood for fuel source such that carbon dioxide is simultaneously produced.

It is further an object of this invention to provide a means for utilizing the spent wood products from the destructive distillation process as fuel means for a further batch of the destructive distillation process.

It is also an object of this invention to provide a single composite unit adapted to being mobile for removal to the source of raw wood.

Other objects of this invention will become apparent upon further consideration of the specification and drawings.

In the drawings:

FIGURE 2 is a side view thereof as seen along line 2—2 of FIGURE 1.

FIGURE 3 discloses the heat exchange unit for condensing the volatile distillation products, and for preheating the water supplied to the boiler.

FIGURE 4 is a front view of invention illustrating a modification of the cooling means provided for condensing the extracted vapors.

Figure 5:
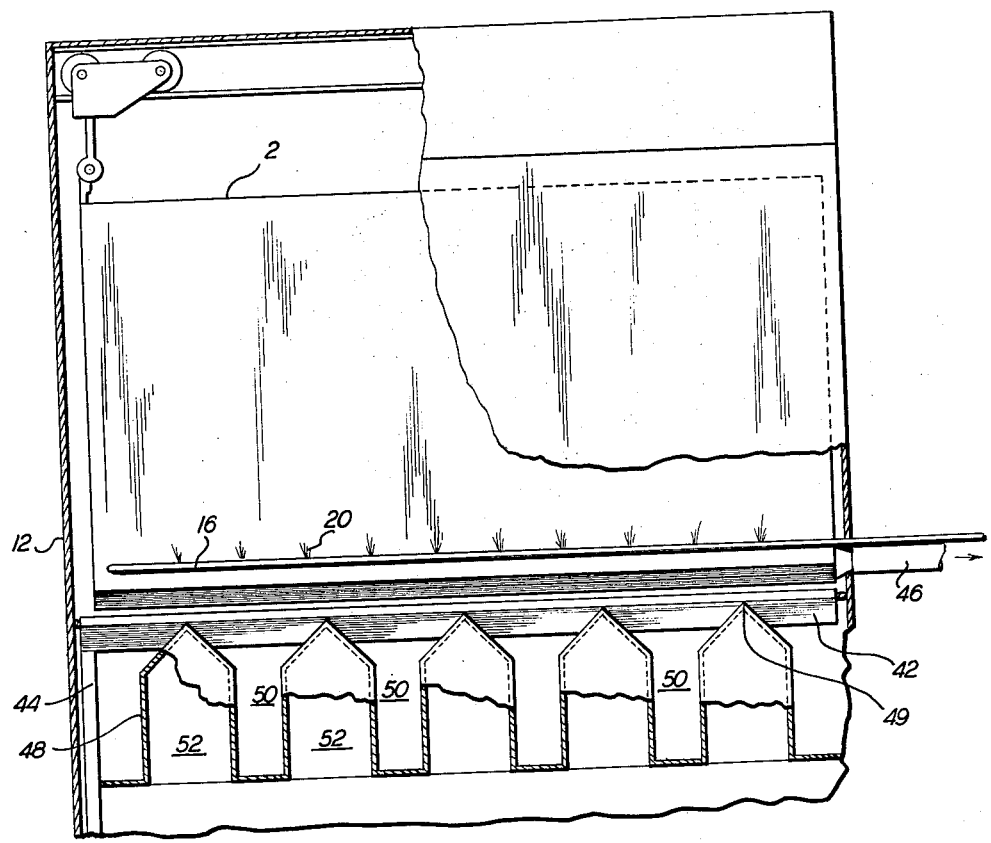

FIGURE 5 is a side view of the modification of FIGURE 4 disclosing an alternative means for condensing the volatile distillation products.

Figure 1:
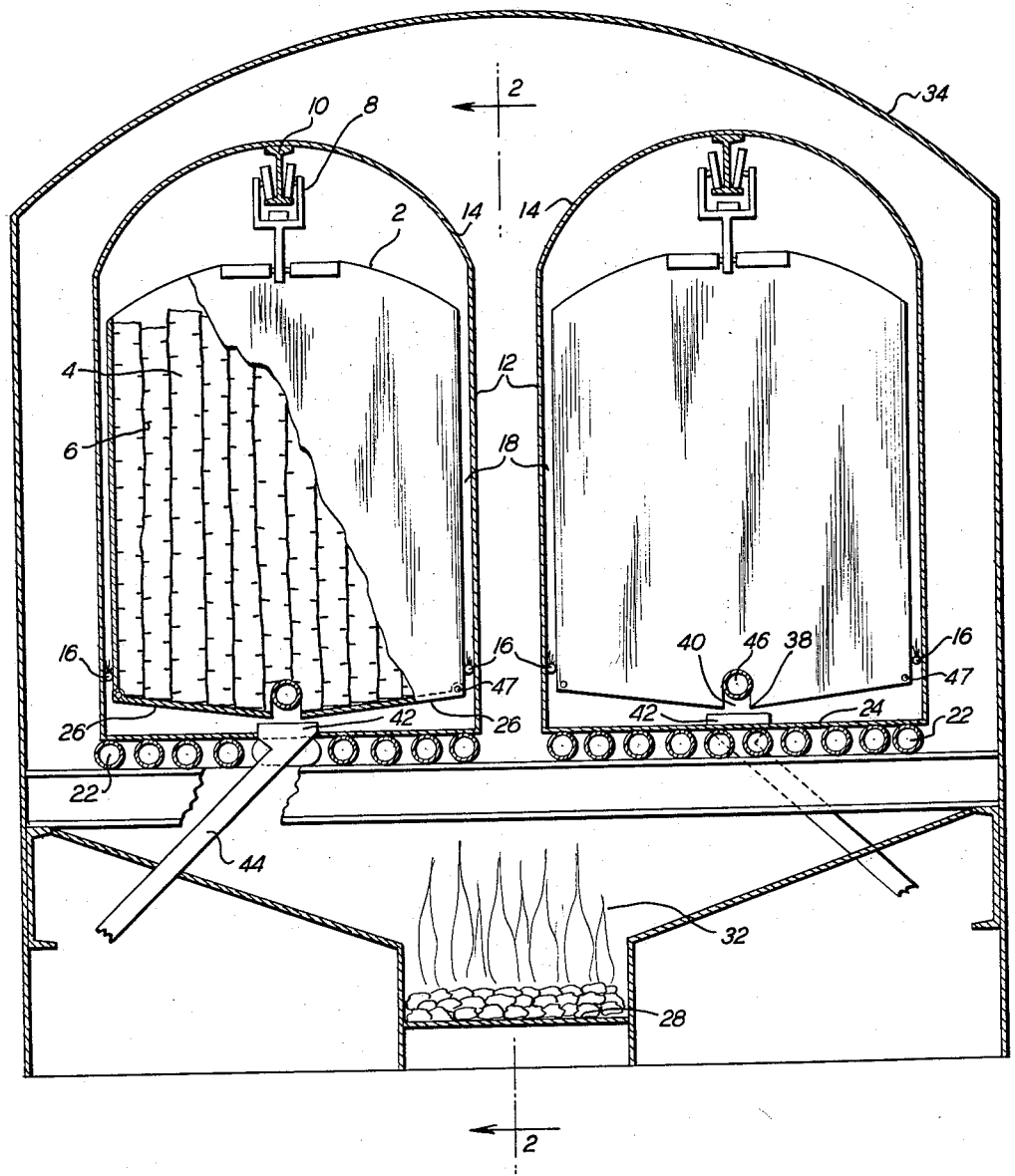
FIGURE 1 is a sectional front view of the invention disclosing double ovens and heat source therefor, and in a cut away portion of one of the racks illustrates the stacking of the logs therein.

Referring to FIGURE 1, there is an illustrated rack means 2 supporting logs 4 placed in an upright manner therein. The logs are vertically orientated, and are scored at points 6 to facilitate in the extraction and draining of resin. The scoring is preferably made in a direction perpendicular to the longitudinal axis of the logs to a depth of from ½ to ⅔ of the diameter of the log. The rack is a substantially open top rectangular container supported by a conveyor means 8 of any common design sliding on a horizontally placed rail 10. The rail and conveyor can be of any standard make designed to support a considerable weight depending upon the size of the rack.

The rack is admitted horizontally by means of the conveyor into a substantially completely closed oven 12, having an arcuately shaped tunnel-like roof 14 adapted to direct rising air and steam downwardly to circulate among logs vertically supported in the racks. Horizontally oriented steam pipes 16 are positioned along side the rack between the sidewalls of the rack and the inner sidewalls 18 of the oven with nozzles or perforations 20 on the upper surface thereof projecting steam into an air draft running vertically upward between the rack sidewalls and the inner sidewalls of the oven. Sufficient clearance is provided between the oven inner walls and the rack outer walls to permit the steam pipes to be positioned there between, and also to permit the racks to be readily inserted and withdrawn from the ovens. Also it is important that the clearance be adequate to permit the upward draft about the steam pipes, as this is the manner contemplated for introducing steam and other solvents into the decomposition area. The updraft of course is provided by virtue of the heat radiated from the inner walls of the oven. Beneath the oven walls and in contact with the bottom surface thereof are located horizontally disposed cooling pipes 22 with inlet 23 and outlet 25 going to and from a boiler means not shown. The cooling pipes are thus adapted to act as pre-heat heat exchangers for the boilers. The pipes 22 run longitudinally with the bottom surface 24 of the oven and are closely spaced to cool the bottom portion of the oven and the lower surface 26 of the racks for the logs. Beneath the oven and water pipes is a grate 28 supporting the fuel utilized for the thermal decomposition process.

The bottom portion of the ovens is provided with a rectangular opening 30 adapted to admit only a limited amount of air into the oven for providing the updraft between the oven inner side walls and rack outer walls.

The unit is illustrated as a double oven unit, with the grate and combustion area 32 located intermediate the two units. Surrounding the ovens and combustion area is a housing unit 34 composed of fire brick or the like. The ovens are preferably composed of thin gauge metal designed to have sufficient strength to support the rail and conveyor system but thin enough to conduct heat therethrough. The surfaces of the oven may be adapted in any known manner for improved radiation, conduction and convection of heat to and from its surfaces. A flue is located at the upper end of the housing 34 by which the combustion gases are dissipated from the combustion area.

From the above description it is apparent that the hot combustion gases are conveyed between and around the oven and by means of convection, radiation and conduction, heat is transferred through the oven walls to the air between the racks and oven inner walls thus creating a strong updraft to convey the steam ejected from the steam pipes and hot air upwardly between the sidewalls of the racks and the inner sidewalls of the oven and down into the racks themselves, the air and steam being directed downwardly through the logs partly by virtue of the concave roof of the oven, and partly by virtue of the location of the air outlet means 40 as will be described below. Thus there is no direct heating of the logs within the racks.

The base 26 of the rack is substantially in the shape of a V, the apex 38 of the V being at the center of the said base and having a slot 40 at that point to permit the condensate to drain into a trough 42 positioned immediately beneath said slot. The trough is adapted to convey the condensed distillation products to an outer container located outside the housing unit by extension 44.

The trough extension 44 is permitted to leave through opening 30 of the bottom of the oven and is maintained sufficiently cool along with the lower surface of the rack by the cooling pipes to keep the condensate in a liquid state, but sufficiently hot to prevent solidification or gumming.

The air convection system thus is as follows: A limited amount of air only is permitted to enter the oven. The high temperature of the oven inner walls creates a strong updraft as described. The air directed downwardly through the logs, for a large part is recirculated after passing through the slot 40 in the base of the racks back between the racks and oven inner wall to create the updraft. A part of the air, of course, escapes out trough 42 and 44, and is replaced by leakage in through opening 30, but it is evident that the recirculation of steam and air permits only limited combustion of the logs within the rack, thus making the process to a considerable extent a retort process with the resultant known economies.

Thermostatically controlled dampers not shown are positioned in the flue spaces on each side of the ovens to modulate and progressively advance the temperature of the oven. An additional damper means may be positioned beneath the fire grate to control the combustion of the firing fuel in this latter instance. The admission of air may be controlled to limit the amount of air for combustion and thus to produce charcoal in a well known manner. The temperature of the cooling pipes, and thus the lower surface temperature of the oven and racks is controlled by valve means effecting the intake or flow of the feed water through the cooling pipes. A final control means is achieved by a valve limiting the flow of steam into the updraft between the sidewalls of the racks and the oven inner walls. It is thus apparent that the combination provides a close control of the temperatures required for decomposition, extraction and condensation.

In addition to the trough 42 for removing the condensate, an open top pipe 46 is also provided for removing any distillate not condensed. The pipe is adapted to fit within the rack above the lower surface thereof to collect distillate being positioned such as to not interfere with the flow of condensate through slot 40, and yet still positioned to intercept the outflowing vapor if necessary. The pipe is adapted to lead outwardly then to a condensing unit. It is also apparent that the pipe serves as a guide means for the lower surface of the rack when the racks are admitted to the ovens.

Thus one has two optional means for collecting distillate depending on the nature of the raw wood and the selective condensation desired. By varying the temperatures of the lower surface of the racks, the distillate can be condensed in situ or conveyed to another condensing unit by pipe means 46. Also it is apparent that the extraction products can be continuously selectively condensed, the lower boiling liquids being conveyed out pipe 46 to an outer condensing unit, the higher boiling liquids being condensed in situ on the lower surface of the racks and conveyed by trough 44 to an outer container. By virtue of the means provided for close control of the oven temperatures and rack lower surface temperatures, namely the cooling pipes control means and other control means mentioned above, any selective distillation and condensation desired can be achieved.

A further important feature of the device is with respect to the lower surface of the racks, which are constructed as gates pivoting at the points of junction or on hinges 47 on the oven side walls. Means are provided to hold the gates in a normally closed position for loading and combustion, and to open the gates for removing the spent wood. Thus after extraction, the racks are removed from the ovens, the gates opened, and the spent wood dropped onto conveyors located beneath the racks. The spent wood then is conveyed onto grates 28 by means of a conveyor for further combustion as fuel for the destructive distillation process.

It is also contemplated that the composite unit be mounted on wheels not shown or other comparable means for mobility.

The method of using the apparatus is as follows: Logs are placed in the racks when the racks are positioned outside of the housing, the logs being scored and placed vertically upright. The racks are then moved into the oven wherein thermal decomposition of the logs occurs. By means of the down draft into the racks circulating steam and air between the logs, distilled vapors are forced downwardly against the lower surface of the rack.

The trough 42 or pipe means 46 then selectively collect and convey the condensed distillate products to a contanier located outside of the oven. When the distillation process has proceeded sufficiently far such that decomposition of the wood is economically and feasibly completed, the racks are moved out of the ovens and the doors or gates at the bottom of the racks are opened to permit the partly decomposed wood to be dropped onto a conveyor to be conveyed onto the grate beneath the oven for further combustion and destruction, primarily as a fuel source for the thermal decomposition of a subsequent batch of raw wood.

The design of the cooling pipes or heat transfer unit for the boiler means is illustrated in FIGURE 3 as a series of closely U-shaped pipes for transverse longitudinal flow across the lower surface of the ovens. The cooling pipes are preferably in contact with the outside lower surface of the oven such that heat is conveyed to the pipes from the oven by means of conduction as well as convection. The cooling pipes operate as a preheat heat-transfer unit for the boiler, the water flowing outwardly and upwardly from the heat exchange or cooling unit to the boiler by means of the outlet 25, FIGURE 2. The boiler means not shown can be of any common make and should preferably be positioned to be heated by the same fuel source described above. Alternatively, after partial combustion, the fuel source may of course be removed to a different area for combustion to heat the boiler means.

FIGURES 4 and 5 illustrate a modification of the invention, particularly with respect to the cooling means for the lower surfaces of the oven. FIGURE 5 shows that in place of the cooling pipes beneath the oven, shielding means 48 are provided, permitting the hot rising gases from the grate 28 to come in contact with only a limited area on the lower surface 24 of the oven 12. The invention contemplates a continuous piece of sheet metal construction beneath the oven being zig-zagged or having exaggerated serrations with a portion 49 of each serration being in contact with the lower surface of the oven. A proposed construction is as shown in FIGURE 5 with a series of "dog-house" like tunnels 52 adapted to permit the cold air to come in contact with said portions 49 in contact with the lower surface of the oven, the intermediate portions spaced between said abovementioned tunnel-like "dog-houses" being heated by hot air permitted to rise therein. The term "dog-houses" is a term used in the machinery art to designate the kennel-shaped construction as shown. The peak of the roof of said construction is as shown adapted to be in contact with the outside surface of the lower surface of the oven thus cooling said surfaces of the oven. Hot air is permitted to rise in alternate portions designated as areas 50, the ends of these intermediate areas being open at each end to permit the hot air to rise from the grate 28 and to circulate and pass through said areas 50 and to rise on the outer sides of the ovens. Hot air also is permitted to rise between the ovens as shown. The cool air in the areas 52 will cool the portions of the lower surface of the oven in contact with the sheet metal roof peak as described above by virtue of the fact that these tunnel-like "dog-houses" although open at the bottom are closed at each end to prevent any intermixing of hot and cold air. Thus it is evident that the bottom surface of the oven would be provided with alternate hot and cold areas comparable to the system described in the preferred embodiment utilizing the cooling pipes.

The important concept of the invention is that the means be provided for controlled cooling of the lower surface of the oven and racks sufficient to condense the vaporized distillation products, or at least the higher boiling extractions thereof, but also to keep the lower surfaces sufficiently hot to maintain the distillate in liquid form.

To permit the cold air to enter areas 52 of the "dog-houses," valve means 54 are provided beneath the row of "dog-houses." The "dog-houses" are permitted to rest on a closed frame support 56 with the valve 54 positioned to selectively admit air from the outside into said open bottomed cold areas or "dog-houses" as shown. The valve can be positioned within the support as disclosed in FIGURE 4 or in any comparable manner.

An additional concept of the invention envisions the attachment of a common Girdler $CO_2$ apparatus to the flue to capture the flue gases and to convert said gases to carbon dioxide for refrigeration purposes. Also it is contemplated that the plant, in addition to being portable, have associated with it a steam-driven generator for producing electrical power.

Other modifications are contemplated within the scope of the present invention.

What is claimed is:

1. In a device for the destructive distillation of wood the combination comprising an oven having sidewalls, end walls, and bottom and top surfaces, movable rack means within said oven having side walls, end walls and a bottom portion for supporting a batch of raw wood, said bottom portion including gate means for discharging spent wood from said rack, fuel burning means beneath said oven for providing heat to said oven, cooling means beneath said oven for controlling the temperature of said rack bottom portion and said oven bottom surface, means for creating a downdraft through said raw wood whereby vaporized products from said wood are condensed on said cooled rack bottom portion, pipe means positioned along said rack and between the side walls of said rack and said oven for injecting steam and solvents into said downdraft, and trough means adjacent said rack bottom portion for collecting and conveying away the condensed products.

2. In a device for the destructive distillation of wood as claimed in claim 1 wherein said gate means includes a gate member pivoted on a side wall to an open position to release the raw wood from said rack on completion of the destructive distillation.

3. In a device for the destructive distillation of wood as claimed in claim 1, said cooling means comprising a series of transverse cooling pipes in contact with the lower outer surface of the oven.

4. In a device for the destructive distillation of wood as claimed in claim 3 whereby, in addition to said trough means for collecting and conveying away the condensed products, said device further comprises pipe means positioned in said rack means above said bottom portion of said rack adapted to collect and convey away distilled products not condensed.

5. In a device for the destructive distillation of wood as claimed in claim 1, said cooling means comprising in combination a series of "dog-houses" formed in a continuous manner and adapted to admit cool outside air and hot air from said fuel means respectively to alternately positioned areas beneath said oven bottom portion and to thus cool and heat alternately positioned portions of said oven bottom portion, and valve means adapted to control the admission of cool air to said cool areas, said combination thus providing means to selectively control the condensation of the extracted vapors on said rack bottom surface.

References Cited in the file of this patent
UNITED STATES PATENTS

| | | |
|---|---|---|
| 14,619 | Perry | Apr. 8, 1856 |
| 399,255 | Freidrich | Mar. 12, 1889 |
| 792,934 | Sibbitt et al. | June 20, 1905 |
| 918,421 | Copilovich | Apr. 13, 1909 |
| 1,110,820 | Pritchard et al. | Sept. 15, 1914 |
| 1,179,616 | Dorman | Apr. 18, 1916 |